United States Patent [19]

Leyten

[11] Patent Number: 5,369,340
[45] Date of Patent: Nov. 29, 1994

[54] DRIVING SCHEME FOR A HIGH INTENSITY DISCHARGE BALLAST DOWN CONVERTER

[75] Inventor: Paul Leyten, Chicago, Ill.

[73] Assignee: North American Philips Corporation, New York, N.Y.

[21] Appl. No.: 968,545

[22] Filed: Oct. 29, 1992

[51] Int. Cl.⁵ .................................................. H05F 1/00
[52] U.S. Cl. .................................... 315/307; 315/224; 315/209 R; 315/DIG. 7
[58] Field of Search ............. 315/307, 291, 224, 209 R, 315/DIG. 7

[56] References Cited

U.S. PATENT DOCUMENTS

| | | |
|---|---|---|
| 4,914,356 | 4/1990 | Cockram ........................... 315/307 |
| 5,051,665 | 9/1991 | Garrison et al. ......... 315/DIG. 7 X |
| 5,235,255 | 8/1993 | Blom ................................ 315/307 X |

FOREIGN PATENT DOCUMENTS 1053236 12/1966 United Kingdom.

Primary Examiner—Robert J. Pascal
Assistant Examiner—Haissa Philogene
Attorney, Agent, or Firm—Edward Blocker; Bernard Franzblau

[57] ABSTRACT

A driving scheme for a high intensity discharge lamp. The driving scheme eliminates the need for a level shifter by requiring only one reference level in determining the level of current to be produced by the down converter. The down converter has a substantially constant D.C. voltage input and consumes a relatively low amount of fixed power relative to the load attached across the output of the down converter.

30 Claims, 1 Drawing Sheet

DRIVING SCHEME FOR A HIGH INTENSITY DISCHARGE BALLAST DOWN CONVERTER

BACKGROUND OF THE INVENTION

This invention relates to a high intensity discharge (HID) lamp ballast and, more particularly, to an improved driving scheme for an HID ballast down converter.

An HID lamp generally includes high pressure mercury, high pressure sodium, metal halide, high pressure metal vapor and low pressure sodium lamps. The alternating current supplied to each of these lamps is provided through commutation of a D.C. current. The D.C. current is provided from a down converter which serves as a D.C. current source, the D.C. current being converted into a D.C. square wave by a commutator.

The down converter includes a switch and a choke. The time duration during which the switch is closed (i.e. turned ON) controls the amount of energy stored within the choke. The amount of the power produced by the down converter is supplied to the lamp based on the time duration during which the switch is turned ON as compared to the time duration during which the switch is turned OFF (e.g. switching frequency and duty cycle).

The down converter switch, typically a MOSFET, is generally turned ON at a frequency of between about 25 to 80 KHz. The MOSFET transition time (i.e. time during which the switch changes from the ON to OFF state or from the OFF to ON state) is about 100 to 500 nanoseconds. During each of these transitions, the voltage across the MOSFET typically changes several hundred volts (e.g. about 300 volts). The MOSFET is turned ON and will remain turned ON by providing a voltage of, for example, approximately 15 volts between the gate and source of the MOSFET. To turn the MOSFET OFF and retain the MOSFET in an OFF state, the voltage between the gate and source of the MOSFET must be, for example, about 0 volts. The voltage at the source of the MOSFET can vary between 0 volts and several hundred volts (e.g. 300 volts). The gate voltage must therefore vary from about 315 volts (i.e. to turn the MOSFET ON when the voltage at the source is about 300 volts) to about 0 volts (i.e. to turn the MOSFET OFF when the voltage at the source is about 0 volts).

When turning the MOSFET from its ON state to its OFF state, the voltage at the gate of the MOSFET must first be adjusted from approximately 315 volts to approximately 300 volts to create a voltage difference of approximately 0 volts between the gate and source. As the voltage of the source rapidly decreases to approximately 0 volts, the gate voltage must rapidly decrease to 0 volts to maintain the MOSFET in its OFF state (i.e. maintaining the voltage between gate and source at approximately 0 volts). The gate voltage therefore follows the source voltage in maintaining the MOSFET in its OFF state. Similarly, in turning the MOSFET from its OFF state to its ON state, the MOSFET gate voltage must be maintained, for example, at approximately 15 volts above the voltage at the MOSFET source. Therefore, the voltage at the gate must rapidly rise from approximately 15 volts to approximately 315 volts. As can readily be appreciated, such wide variations of voltage during such short transitions (i.e. about 100 to 500 nanoseconds) can be difficult to achieve.

In adjusting the voltage applied to the gate of the MOSFET between several hundred volts and approximately 0 volts, conventional driving circuitry employs a level shifter. The level shifter shifts the driving voltage produced by a current mode controller of the down converter relative to the voltage at the MOSFET source. The output from the level shifter, which is applied to the MOSFET gate, is subject to distortion from electromagnetic interference (EMI) and/or parasitic capacitances within the MOSFET and/or level shifter. Such distortion makes it difficult to apply and/or maintain the desired voltage at the gate relative to the source of the MOSFET. Consequently, the MOSFET can be turned ON when it should be turned OFF and turned OFF when it should be turned ON.

The lever shifter, by being subjected to an extremely fast switching transition, high voltage levels and distortion of its output (driving) signal, represents the weak link in a conventional down converter driving scheme. This drawback is based on the driving signal applied to the gate of the MOSFET being derived from two different voltage references. These references, at times, are separated from one another by relatively large differences in voltage over very short periods of time (i.e. very fast switching transitions).

A conventional driving scheme, such as disclosed in Great Britain Patent No. 1,053,236, eliminates the need for a level shifter by connecting one end of a lamp to the positive terminal of the power source with the switch connected between the other end of the lamp and the negative terminal of the power source. When one end of an HID lamp, however, is continuously coupled to the positive terminal of the D.C. power source (positive terminal of the down converter), sodium ions within certain types of HID lamps begin to migrate out of the lamp thereby reducing lamp life. It is therefore highly desirable to avoid continuously coupling either terminal of the lamp to the positive terminal of the power supply.

Accordingly, it is desirable to provide an HID ballast down converter having an improved driving scheme which requires only one reference voltage level. In particular, the HID ballast down converter should employ a driving scheme which eliminates the need for a level shifter in controlling the conductive and non-conductive states of the down converter switch. The HID ballast down converter driving scheme should also minimize ion migration out of the lamp.

SUMMARY OF THE INVENTION

Generally speaking, in accordance with the invention, a ballast includes a power supply for supplying power at a D.C. voltage between a first supply terminal and a second supply terminal. The first supply terminal is of a positive voltage potential relative to the second supply terminal. The ballast also includes a down converter for producing a varying level of output current. The down converter includes an energy storage device for storing energy based on the power produced by the power supply. The down converter also includes a switching device continuously coupled to the first supply terminal and adapted to control, in response to a driving signal, the storage of energy within the energy storage device. The down converter further includes a controller responsive to the varying level of output current without regard to variations in the D.C. voltage for producing the driving signal. In accordance with one feature of the invention, the controller is responsive to only one reference level in producing the driving signal.

The present invention therefore provides an improved driving scheme which requires only one reference voltage level and thereby eliminates the need for a level shifter in controlling the conductive and non-conductive states of the down converter switch. The driving scheme of the present invention also minimizes ion migration out of the lamp by continuously coupling the switching device rather than a lamp to the first supply terminal, that is, to the terminal of the power supply having a positive voltage potential relative to the second supply terminal.

In accordance with another feature of the invention, the switching device includes a first end and a second end, the first end being continuously coupled to the first terminal of the power supply. The reference level is the voltage at the second end of the switching device.

The controller, in producing the driving signal based on the varying level of output current without regard to variations in the D.C. voltage, requires that the D.C. voltage be at a substantially constant value and that the power consumed by the down converter be stabilized at a substantially constant level. Preferably, the switching device is a MOSFET having a source serving as the reference level. The energy storage device is preferably an inductive device such as an inductor. The ballast in combination with a high intensity discharge lamp varies the level of current being supplied to the lamp.

In accordance with another aspect of the invention, a method of producing lamp power at a varying level of current and a first level of D.C. voltage comprises the steps of supplying input power at a second level of voltage between a first terminal and a second terminal, storing energy in an energy storage device in response to the input power and controlling the storage of energy in the energy storage device based on a driving signal supplied to a switching device. The switching device is continuously coupled to the first terminal. The method further includes adjusting the driving signal in response to the level of current associated with the lamp power without regard to variations in the second level of D.C. voltage so as to maintain lamp power at a substantially constant level. In accordance with this aspect of the invention, the step of adjusting is based on only one reference level. The switching device and energy storage device are coupled together wherein the reference level is between the switching device and energy storage device.

Accordingly, it is an object of the invention to provide an improved driving scheme for an HID ballast down converter which requires only one reference voltage level.

It is another object of the invention to provide an improved driving scheme for an HID ballast which eliminates the need for a level shifter in controlling the conductive and non-conductive states of the down converter switch.

It is a further object of the invention to provide an improved driving scheme for an HID ballast down converter which minimizes ion migration out of the lamp.

These and other objects and advantages of the invention will, in part, be obvious, and will, in part, be apparent from the specification.

The invention accordingly comprises several steps and the relation of one or more of such steps with respect to each of the others, and the device embodying features of construction, combination of elements and arrangements of parts which are adapted to effect such steps, all as exemplified in the following detailed disclosure, and the scope of the invention will be indicated in the claims.

BRIEF DESCRIPTION OF THE DRAWINGS

For a fuller understanding of the invention, reference is made to the following description taken in connection with the accompanying drawing, in which.

DETAILED DESCRIPTION OF THE PREFERRED EMBODIMENT

Figure 1:
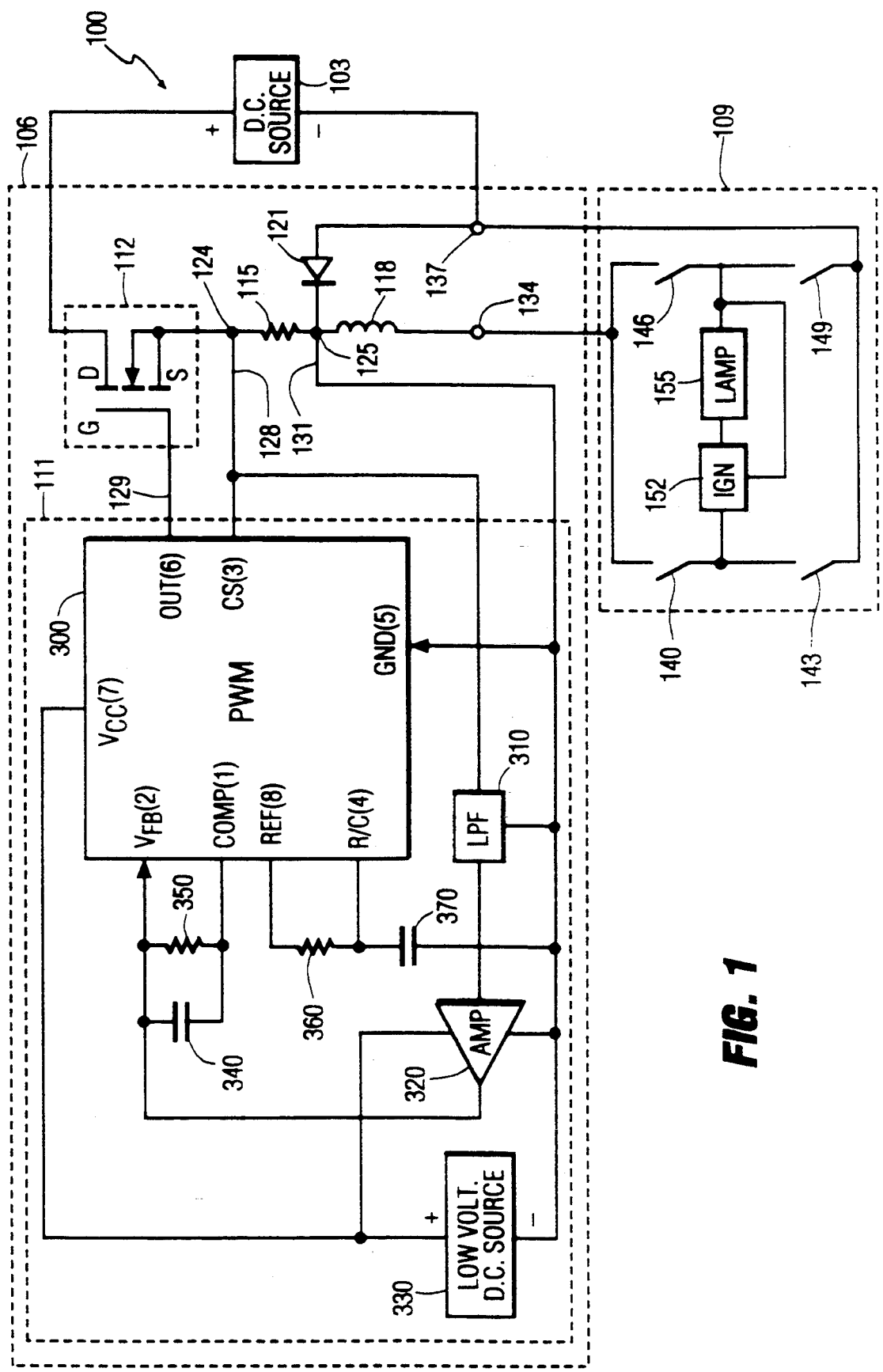
FIG. 1 is a schematic diagram of a ballast in accordance with the invention.

Referring now to FIG. 1, a ballast 100 in accordance with the invention includes a D.C. source 103, a down converter 106 and a load 109. Down converter 106 includes a controller 111 for controlling the switching of a switching device 112, a resistor 115, a choke 118 and a diode 121. Switching device 112 is connected at one end to the positive terminal of D.C. source 103 and at its other end to one end of resistor 115. Preferably, a junction 124 between switching device 112 and resistor 115 serves as the sole reference for controller 111 and is connected by an input line 128 to controller 111 as will be further discussed below.

A driving signal for controlling when switching device 112 is turned ON and OFF is supplied by controller 111 to switching device 112 along an output line 129. A junction 125 between the other end of resistor 115 and choke 118 is also connected by an input line 131 to controller 111 and to a cathode of diode 121. The other side of choke 118 and an anode of diode 121 are respectively connected to a pair of terminals 134 and 137 which represent the outputs of down converter 106.

Load 109 is connected to terminals 134 and 137 of down converter 106. In one preferred embodiment of the invention, load 109 includes four switches 140, 143, 146 and 149, a series ignitor 152 and an HID lamp 155. Switches 140, 143, 146 and 149 serve as a commutator. Switches 140 and 149 open and close together. Similarly, switches 143 and 146 open and close together. Control circuitry for controlling the opening and closing of switches 140 and 149, 146 and 143, although not shown, is well known in the art. The commutator periodically reverses the flow of current through ignitor 152 and lamp 155. In other words, switches 140, 143, 146 and 149 commutate the flow of current flowing through ignitor 152 so as to provide an alternating current for powering lamp 155. Lamp 155 is a high intensity discharge lamp such as a high pressure sodium, low pressure sodium, high pressure mercury, metal halide or high pressure metal vapor lamp. In order to ignite lamp 155, a high voltage pulse typically of several thousand volts must be applied across the electrodes of lamp 155.

Switching device 112 includes a MOSFET, it being understood that other suitable devices such as, but not limited to, a bipolar transistor can be used for device 112. The gate of the MOSFET is connected to output line 129. Controller 111 include a pulse width modulator (PWM) 300, a low pass filter (LPF) 310, an operational amplifier (AMP) 320, an internal D.C. voltage source 330 (e.g. of approximately 15 volts), a pair of capacitors 340 and 370, and a pair of resistors 350 and 360. PWM 300 includes inputs for current sense (CS), voltage feedback ($V_{FB}$), low voltage power supply ($V_{cc}$), ground (GND) and operating frequency (R/C)

and outputs for gate drive (OUT), compensating signal (COMP) and reference (REF).

PWM 300 is a current mode controller IC well known in the art and is available from Unitrode Integrated Circuits Corporation of Merrimack, N.H. as part no. UC3804. This current mode controller from Unitrode Integrated Circuits Corporation includes pins 1, 2, 3, 4, 5, 6, 7 and 8 which correspond to the COMP output, $V_{FB}$ input, CS input, R/C input, GND input, OUT output, $V_{cc}$ input and REF output, respectively.

Junction 124 of down converter 106 is connected through input line 128 to both the CS input of PWM 300 and to an input of LPF 310. LPF 310 is a resistor-capacitor (RC) network (having an RC first time constant of between approximately 100 milliseconds to 1 second) for removing the high frequency components of the voltage present at junction 124. Other low pass filter networks can be used other than a resistor-capacitor network provided that the output of LPF 310 produces an average value of the voltage at junction 124. The output signal of LPF 310 is amplified by AMP 320. AMP 320 is powered by a voltage source 330 and provides an output signal to the $V_{FB}$ of PWM 300. AMP 320 is well known in the art and is available from Motorola Inc., of Phoenix, Ariz. as Part No. LM358N.

The positive terminal of internal D.C. voltage source 330 is connected to both the $V_{cc}$ input of PWM 300 and to AMP 320. The negative terminal of internal D.C. voltage source 330 is connected to AMP 320 and LPF 310, the GND input of PWM 300, junction 125 (along input line 128) and one end of capacitor 370. The other end of capacitor 370 is connected to one end of resistor 360 and to the R/C input of PWM 300. The other end of resistor 360 is connected to the REF output of PWM 300.

The signal inputted to AMP 320 is representative of the output power of down converter 106 assuming D.C. voltage source 103 maintains a relatively constant voltage level and the losses within down converter 106 are relatively constant and low as compared to the power outputted by down converter 106 at terminals 134 and 137. An internal error amplifier of PWM 300 connected between the $V_{FB}$ input and the COMP output maintains the voltage supplied to the input $V_{FB}$ from amplifier 320 at a relatively constant level. Capacitor 340 and resistor 350 serve as an integrator for integrating the signal produced by AMP 320 and thereby providing necessary correction for maintaining a relatively constant voltage provided to input $V_{FB}$. The signal produced by the REF output of PWM 300 is fed through resistor 360 into the R/C output of PWM 300 based on the RC time constant of resistor 360 and capacitor 370. The signal outputted to the R/C input provides an operating frequency for PWM 300.

The gate drive output OUT of PWM 300 provides a driving signal along output line 129 to the gate of the MOSFET serving as the switching device 112. The driving signal adjusts the duty cycle and/or frequency of switch 112 so as to produce a constant, predetermined level of power at terminals 134 and 137 of down converter 106.

In accordance with one preferred embodiment of the invention, D.C. source 103 produces a stable relatively constant voltage of about 300 volts. Switch 112 is a MOSFET available from International Rectifier Co. of El Segundo, Calif. as Part No. IRF 740. Resistor 115 includes two resistors, each resistor nominally rated at about 0.22 ohms, 1 watt. Choke 118 is a 2.2 millihenry inductor.

As can now be readily appreciated, down converter 106 produces a relatively constant level of power regardless of variations in current required by or voltage applied to load 109 provided the power consumption of down converter 106 is substantially constant and relatively low compared to the power demanded by load 109 and provided that a substantially stable, constant D.C. voltage level is produced by D.C. source 103. More particularly, ballast 100 is able to meet the power demands of load 109 without monitoring the voltage of load 109. The power consumed by load 109 is determined based on the power supplied to down converter 106 inasmuch as the power losses of down converter 106 are assumed to be relatively constant (a reasonable assumption since down converter 109 power losses stabilize after some brief fixed period of time). When a stable, relatively constant D.C. voltage level is produced by D.C. source 103, the average level of current flowing through resistor 115 is proportional to the input power level of down converter 106. By controller 111 regulating this average current level flow through resistor 115, power outputted by down converter 106 supplied to load 109 can be maintained at a substantially fixed, predetermined value.

As compared to a conventional down converter, the voltage across load 109 need no longer be measured in order to determine the power consumed by load 109. The driving scheme of down converter 106 requires only one reference voltage for controller 111, that is, only one reference level relative to all other signals inputted to or outputted by controller 111. This reference voltage is the voltage at junction 124, that is, the junction between switch 112 and resistor 115. All other signals inputted to or outputted by controller 111 are referenced to the voltage at junction 124. The only other signal inputted to controller 111 is measured at junction 125 and supplied to controller 111 along input line 131. The only signal outputted from controller 111 is along line 129.

Only one reference voltage (e.g. the voltage at junction 124-source of the MOSFET) is required by no longer supplying another signal inputted to controller 111 referenced to the negative terminal of D.C. voltage source 103. Alternatively, the voltage at junction 125 rather than at junction 124 can serve as the reference voltage for controller 111. That is, through the elimination of any input signal to controller 111 representing the voltage across load 109 as in a conventional down converter driving scheme, the present invention eliminates the need for at least two different reference voltage levels (i.e. voltage at the negative terminal of D.C. voltage source 103 and the voltage at the source of the MOSFET) as required in a conventional down converter driving scheme. The present invention therefore avoids the need for a level shifter shifting from one voltage level (i.e. negative terminal of D.C. voltage source) to the other reference voltage level (i.e. source of the MOSFET) in supplying a driving signal to the gate of the MOSFET.

The invention therefore removes the weak link (i.e. level shifter) commonly employed in a conventional down converter driving scheme. Regulation of down converter switch 112 is therefore more reliable. In particular, distortion of the driving signal based on EMI and parasitic capacitances within the level shifter is substantially avoided thereby substantially eliminating turning switch 112 ON and OFF when not desired.

Furthermore, in accordance with the invention, the driving scheme does not require one end of the load (e.g. lamp 155) be coupled to the positive terminal of D.C. voltage source 103. Accordingly, ion (e.g. sodium) migration out of lamp 155 is avoided.

It will thus be seen that the objects set forth above, and those made apparent from the preceding description, are efficiently attained and, since certain changes may be made in the above construction without departing from the spirit and scope of the invention, it is intended that all matter contained in the above description and shown in the accompanying drawing shall be interpreted as illustrative and not in a limiting sense.

It is also to be understood that the following claims are intended to cover all of the generic and specific features of the invention herein described, and all statements of the scope of the invention, which as a matter of language, might be said to fall therebetween.

What is claimed is:

1. A ballast comprising:
   supply means for supplying power at a D.C. voltage between a first supply terminal and a second supply terminal, said first supply terminal being of a positive voltage potential relative to said second supply terminal; and
   down converter means for producing a varying level of output current, said down converter means including energy storage means for storing energy based on the power produced by said supply means, switching means continuously coupled to the first supply terminal and adapted to control, in response to a driving signal, the storage of energy within said energy storage means, and control means responsive to the varying level of output current without regard to variations in the D.C. voltage for producing said driving signal.

2. The ballast of claim 1, wherein said control means is responsive to only one reference level in producing said driving signal.

3. The ballast of claim 2, wherein said switching means includes a first end and a second end, said first end being continuously coupled to said first terminal of said supply means, and wherein said reference level is the voltage at said switching means second end.

4. The ballast of claim 1, wherein the D.C. voltage is at a substantially constant value.

5. The ballast of claim 1, wherein said control means produces a driving signal to operate the switching means so that the power consumed by the down converter means stabilizes at a substantially constant level.

6. The ballast of claim 1, wherein the switching means is a MOSFET having one main electrode continuously coupled to said first supply terminal and a second main electrode at which a reference voltage is developed which serves as the only reference level for the MOSFET switching means and for the control means.

7. The ballast of claim 1, wherein the storage means is an inductive device.

8. The ballast of claim 1, wherein said energy storage means and said switching means are coupled together to derive a reference level therebetween, and wherein said control means is responsive to said reference level in producing said driving signal.

9. The ballast of claim 1, in combination with a high intensity discharge lamp, said varying level of output current being supplied to said lamp.

10. The ballast of claim 2, wherein the switching means is a MOSFET having a source at which said reference level is produced.

11. The ballast of claim 2, wherein said energy storage means and said switching means are coupled together, said reference level being a voltage produced at a circuit point between the energy storage means and the switching means.

12. A ballast comprising:
    supply means for supplying power at a substantially constant D.C. voltage between a first supply terminal and a second supply terminal, said first supply terminal being at a positive voltage potential relative to said second supply terminal; and
    down converter means for producing a varying level of output current, said down converter means including energy storage means for storing energy based on the power produced by said supply means, switching means continuously coupled to said first supply terminal and adapted to control, in response to a driving signal, the storage of energy within said energy storage means, and control means responsive to the varying level of output current without regard to a variation in the D.C. voltage for producing said driving signal;
    wherein said control means is responsive to only one reference level in producing said driving signal, said switching means including a MOSFET having a source serving as said reference level and coupled to said energy storage means.

13. A ballast comprising:
    supply means for supplying power at a D.C. voltage between a first supply terminal and a second supply terminal, said first supply terminal being of a positive voltage potential relative to said second supply terminal; and
    down converter means for producing a varying level of output current, said down converter means including energy storage means for storing energy based on the power produced by said supply means, switching means continuously coupled to the first supply terminal and adapted to control, in response to a driving signal, the storage of energy within said energy storage means, and control means responsive to the varying level of output current and having only one reference level for producing said driving signal.

14. The ballast of claim 13, wherein said switching means includes a first end and a second end, said first end being continuously coupled to said first terminal of said supply means, and wherein said reference level is the voltage at said switching means second end.

15. The ballast of claim 13, wherein the D.C. voltage is at a substantially constant value.

16. The ballast of claim 13, wherein the power consumed by the down converter means stabilizes at a substantially constant level.

17. The ballast of claim 13, wherein the switching means is a MOSFET having a gate, wherein said gate is not connected to a level shifter.

18. The ballast of claim 13, wherein the storage means is an inductive device.

19. The ballast of claim 13, wherein said energy storage means and said switching means are coupled together, said reference level being a voltage produced at a circuit point between the energy storage means and the switching means.

20. The ballast of claim 13 in combination with a high intensity discharge lamp, said varying level of output current being supplied to said lamp.

21. The ballast of claim 13, wherein the switching means is a MOSFET having a source at which said reference level is produced.

22. A method for producing lamp power at a varying level of current and first level of D.C. voltage, comprising the steps of:

supplying input power at a second level of D.C. voltage between a first terminal and a second terminal, wherein said second level of D.C. voltage is greater than said first level of D.C. voltage, and wherein said first terminal is of a positive voltage potential relative to said second terminal;

storing energy in energy storage means based on said input power;

controlling the storage of energy in said energy storage means based on a driving signal supplied to a switching means, said switching means being continuously coupled to said first terminal; and adjusting the driving signal in response to the level of current associated with said lamp power without regard to variations in the second level of D.C. voltage so as to maintain lamp power at a substantially constant level.

23. The method of claim 22, wherein the step of adjusting is based on only one reference level.

24. The method of claim 23, wherein the switching means and the energy storage means are coupled together, said reference level being a voltage produced at a circuit point between the switching means and the energy storage means.

25. The method of claim 23, wherein said switching means is a MOSFET having a source serving as said reference level.

26. The method of claim 24, wherein said switching means is a MOSFET having a source serving as said reference level.

27. A method for producing lamp power at a varying level of current and first level of D.C. voltage, comprising the steps of:

supplying input power at a second level of D.C. voltage between a first terminal and a second terminal, wherein said second level of D.C. voltage is greater than said first level of D.C. voltage, and wherein said first terminal is of a positive voltage potential relative to said second terminal;

storing energy in the energy storage means based on said input power;

controlling the storage of energy in said energy storage means based on a driving signal supplied to a switching means, said switching means being continuously coupled to said first terminal; and adjusting the driving signal in response to the level of current associated with said lamp power based on only one reference level so as to maintain lamp power at a substantially constant level.

28. The method of claim 27, wherein the switching means and the energy storage means are coupled together, said reference level being a voltage between the switching means and the energy storage means.

29. The method of claim 27, wherein said switching means is a MOSFET having a source serving as said reference level.

30. The method of claim 28, wherein said switching means is a MOSFET having a source serving as said reference level.

* * * * *